O. J. COUGHLIN.
NUT TAPPING MACHINE.
APPLICATION FILED JUNE 19, 1917.
1,285,564.
Patented Nov. 19, 1918.
13 SHEETS—SHEET 11.
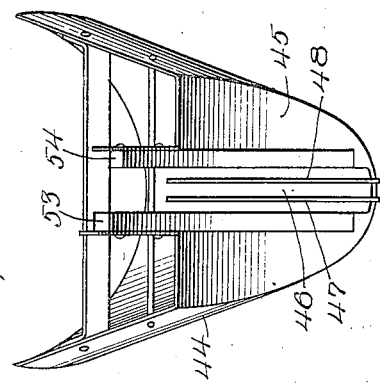
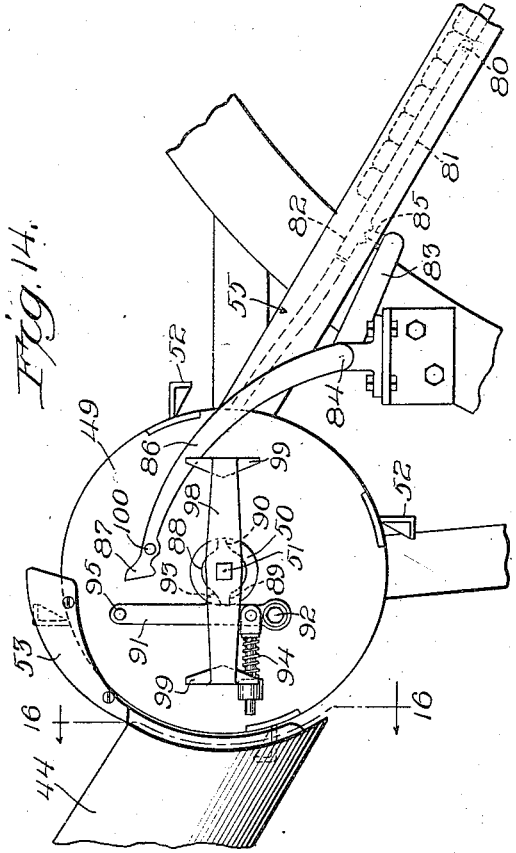
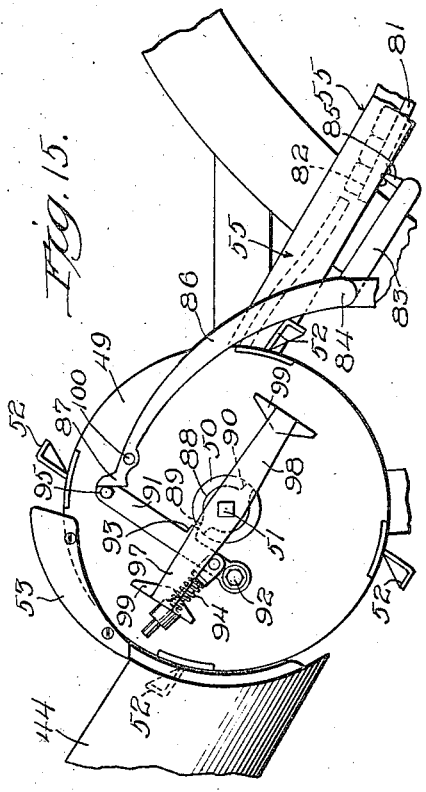

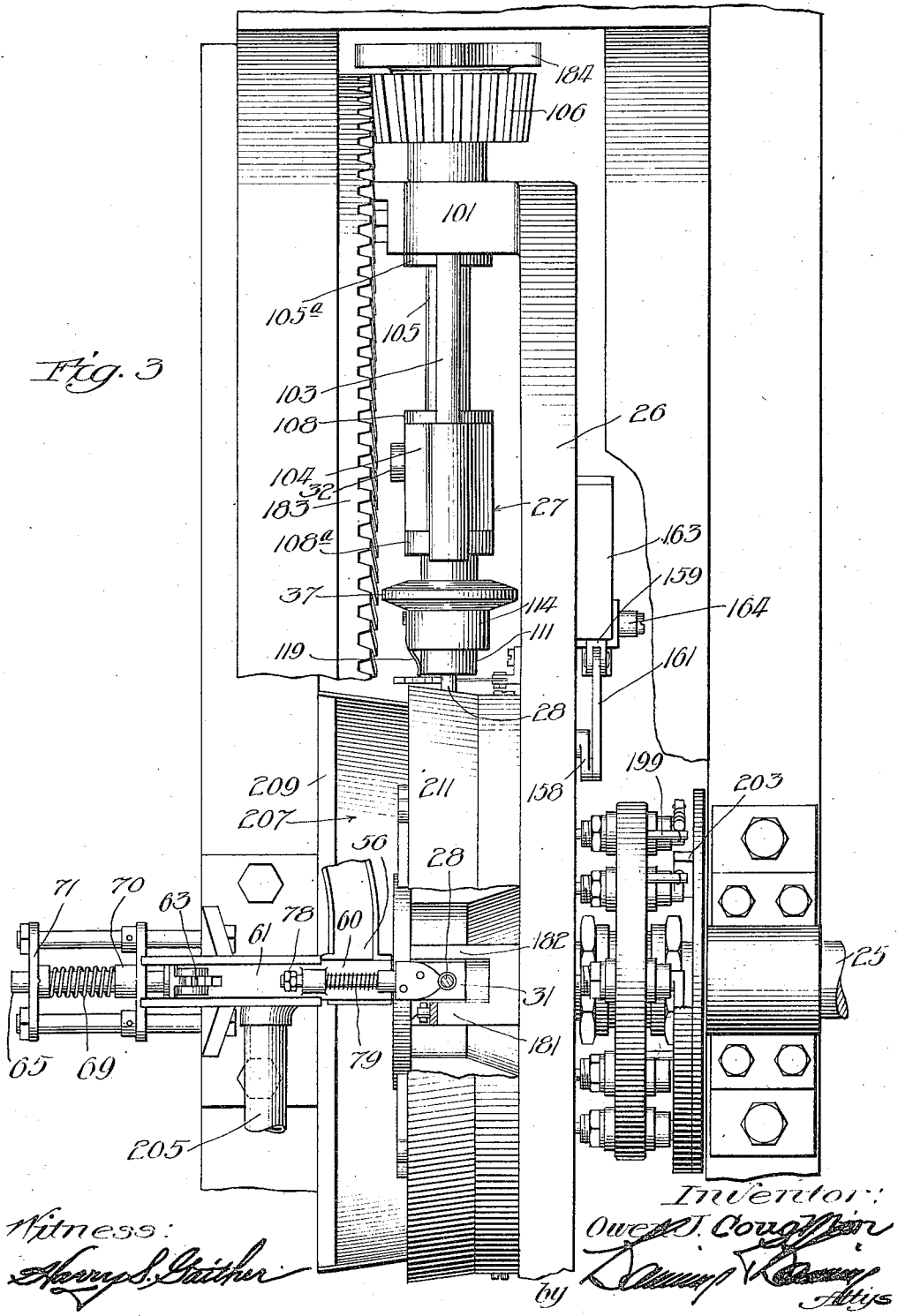

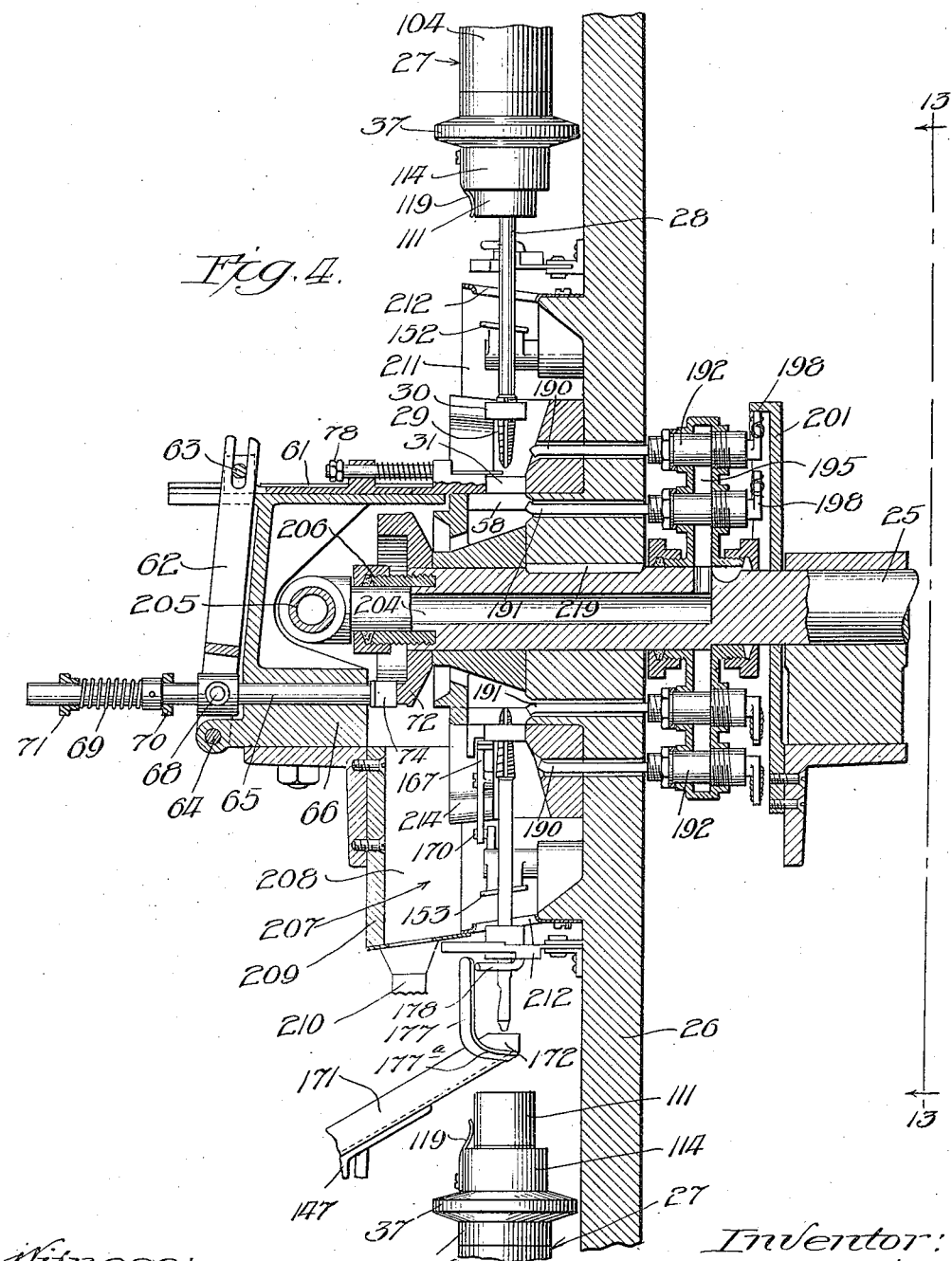

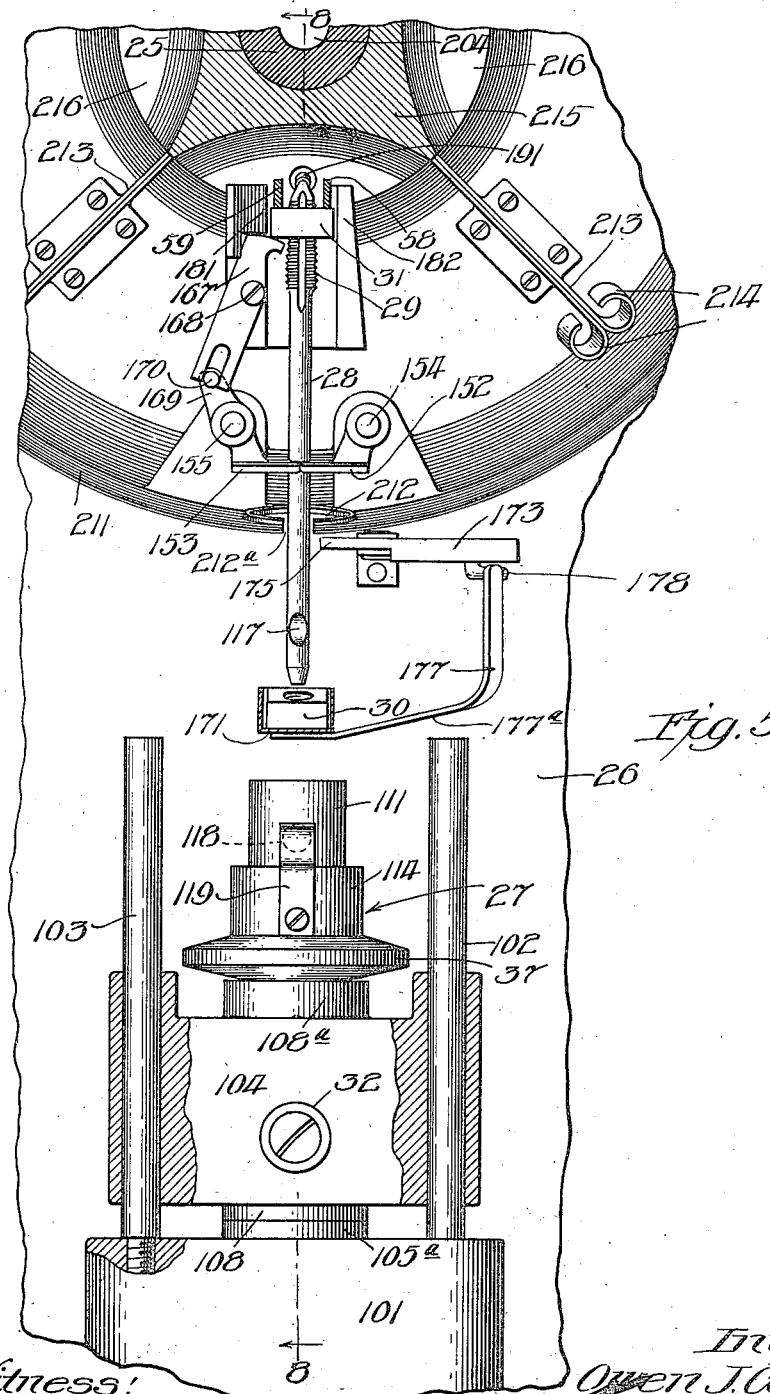

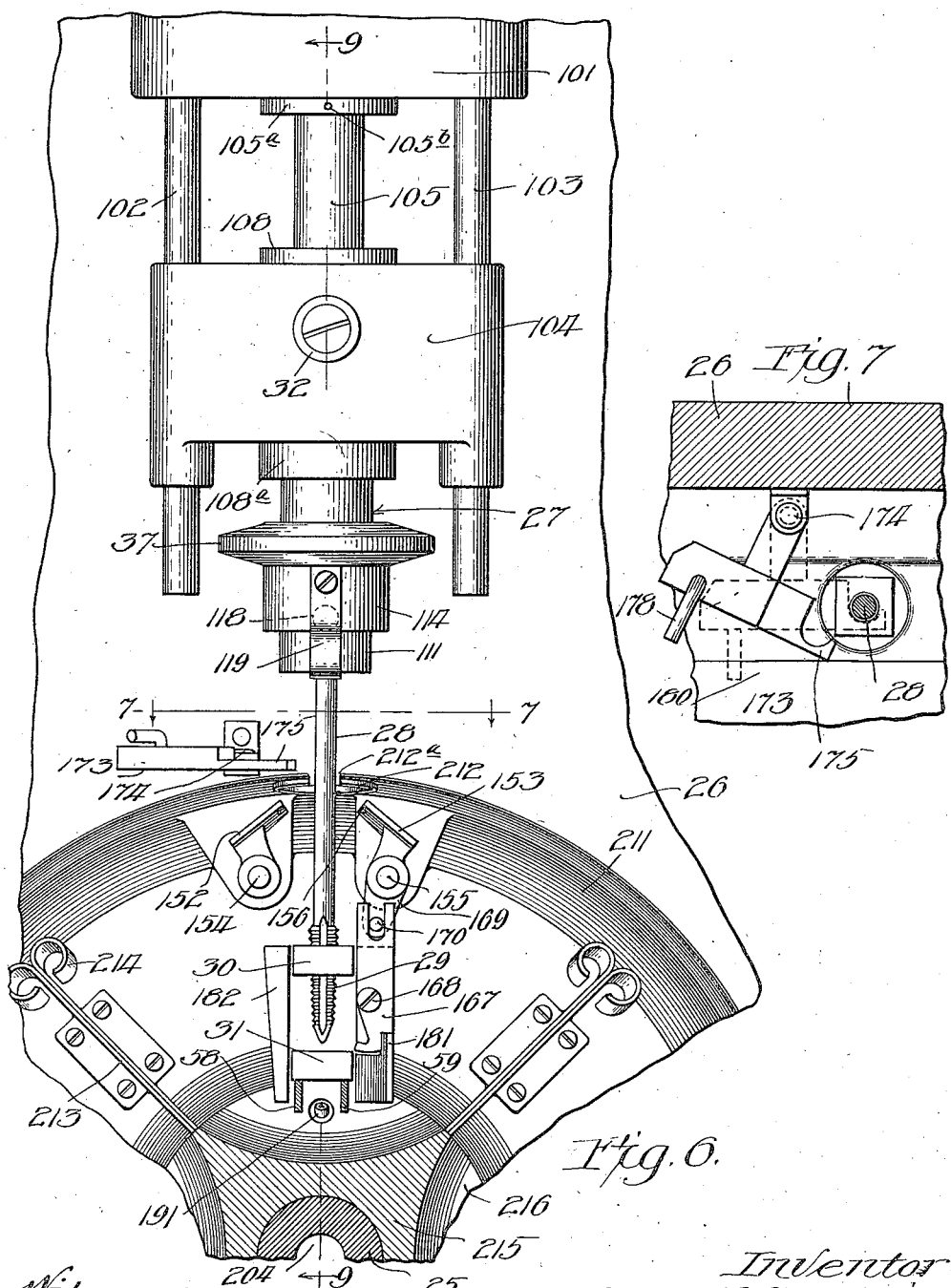

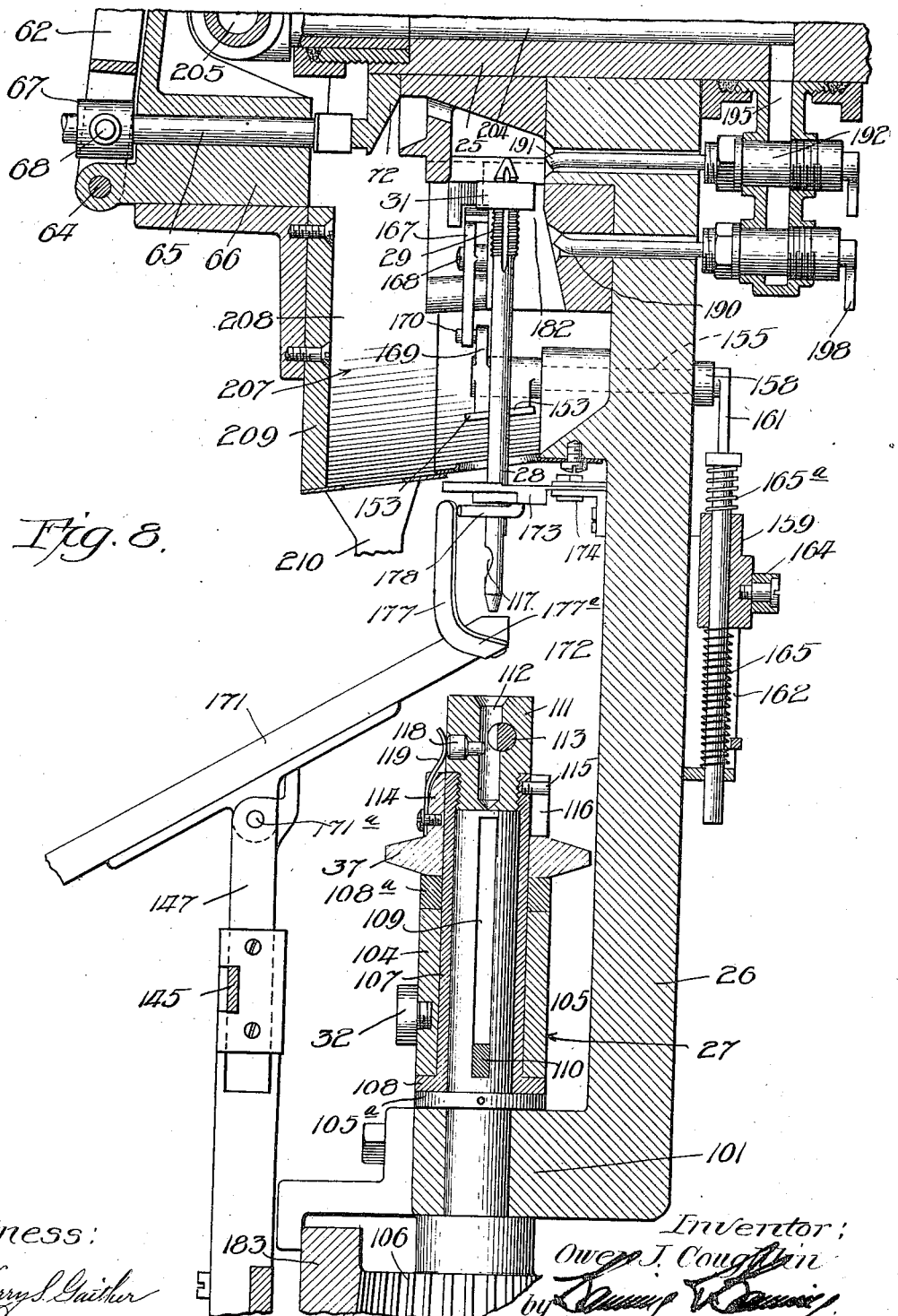

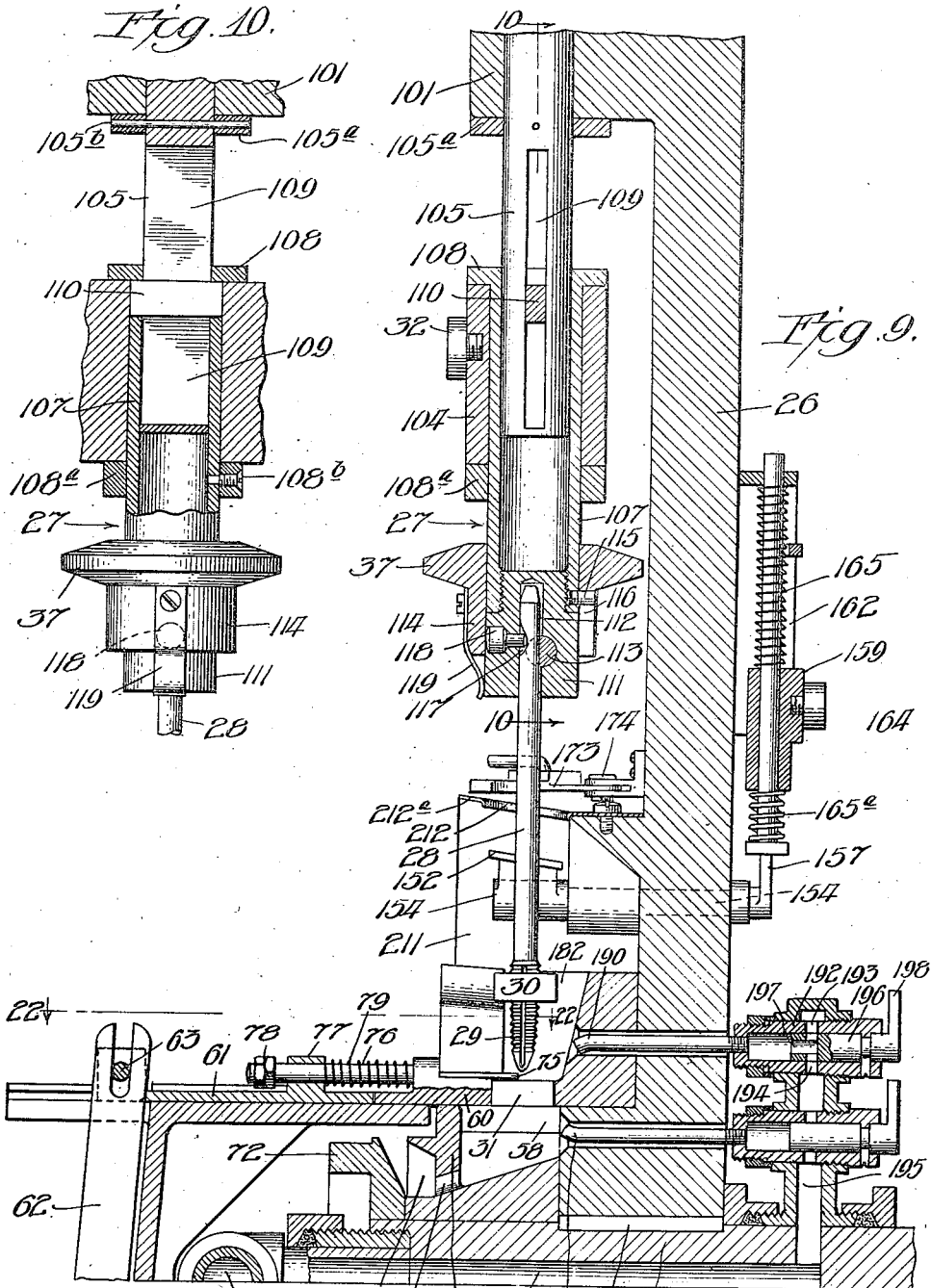

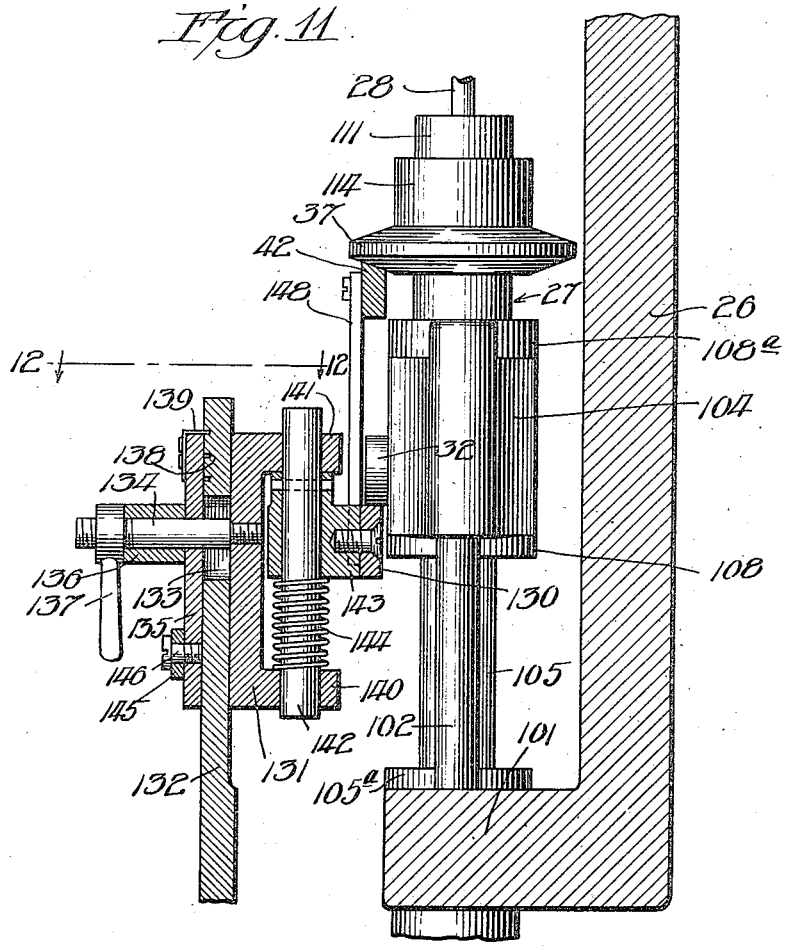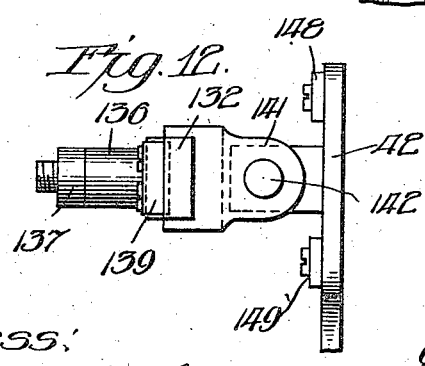

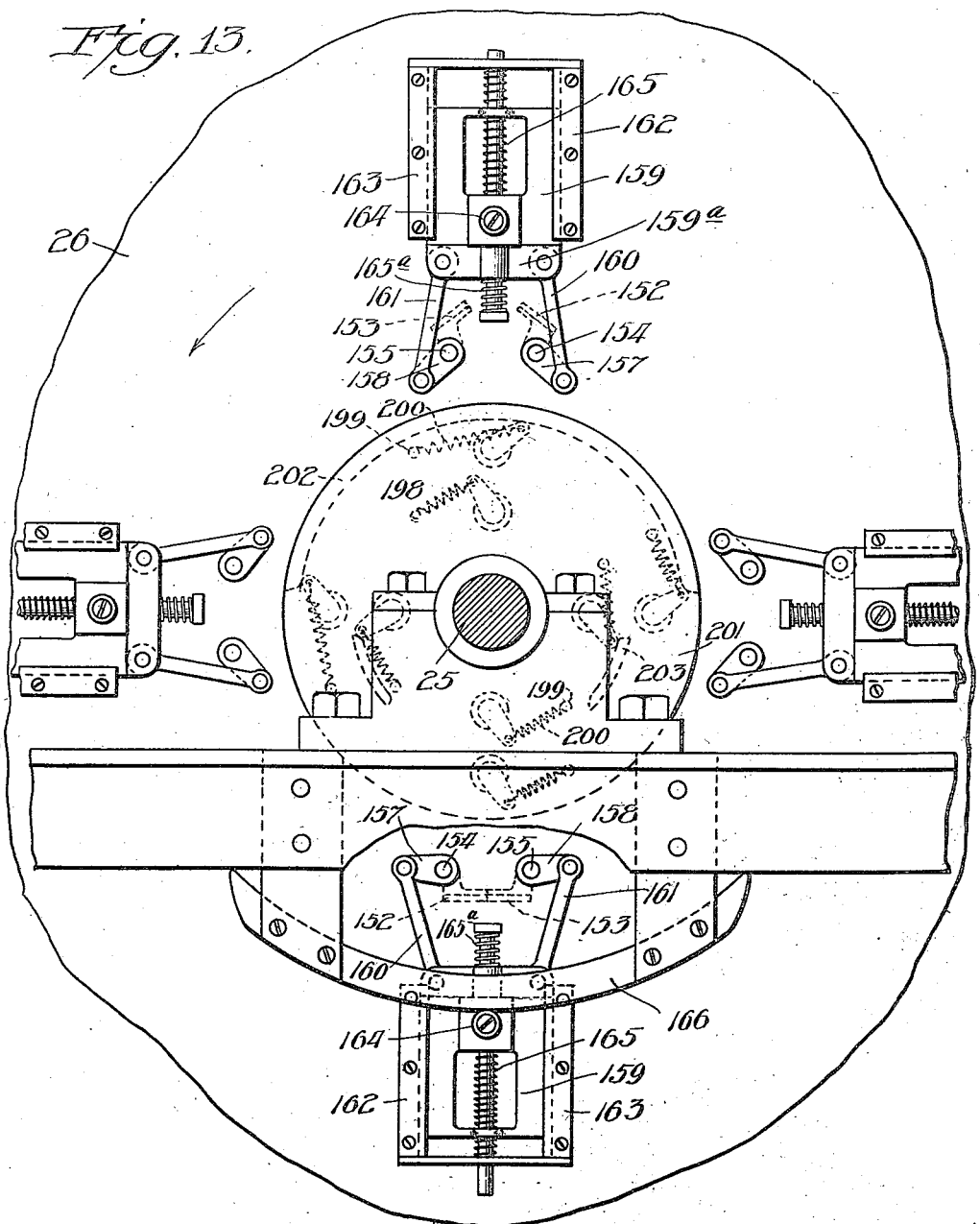

O. J. COUGHLIN.
NUT TAPPING MACHINE.
APPLICATION FILED JUNE 19, 1917.
1,285,564.
Patented Nov. 19, 1918.
13 SHEETS—SHEET 12.
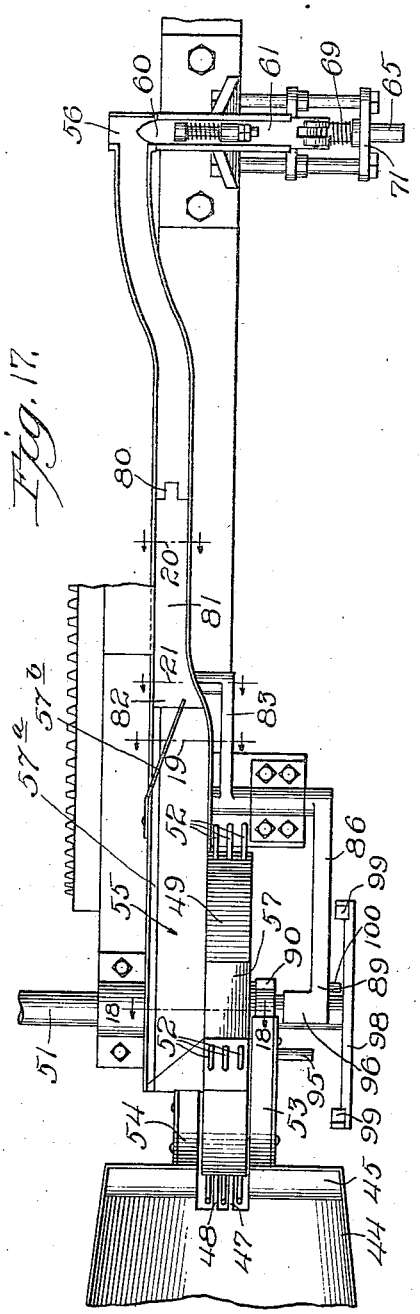
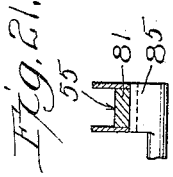
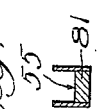
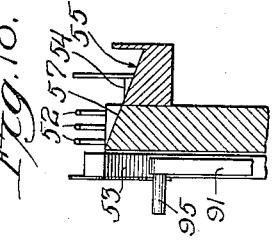
Witness:
Harry S. Gaither
Inventor:
Owen J. Coughlin
by
Attys

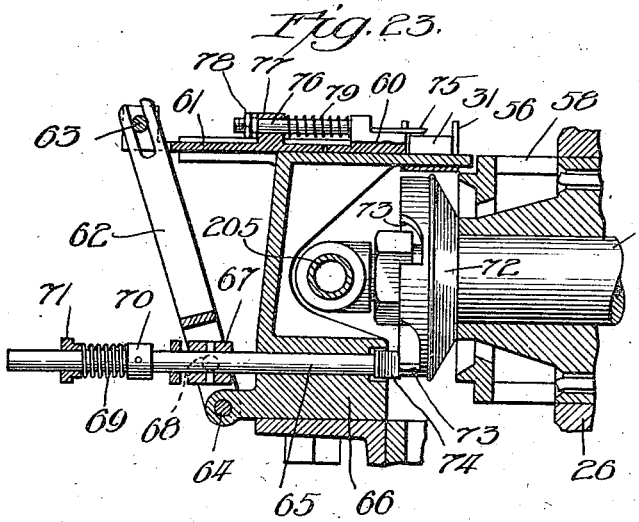
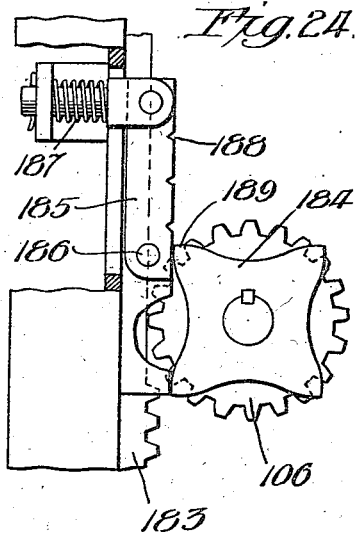
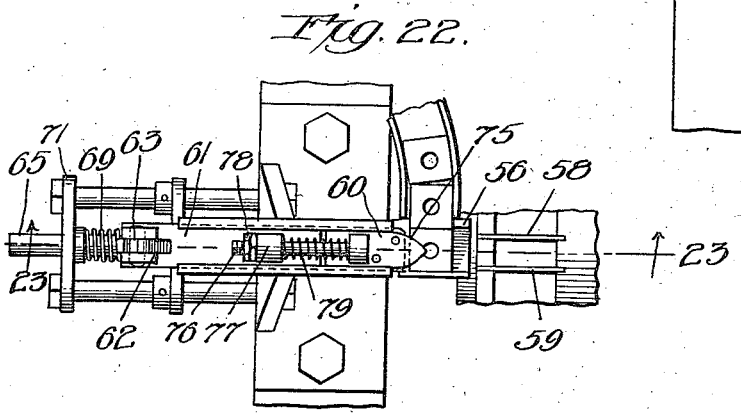

UNITED STATES PATENT OFFICE.

OWEN J. COUGHLIN, OF TIPTON, INDIANA, ASSIGNOR OF ONE-THIRD TO GARLAND RATHEL AND ONE-THIRD TO JOHN E. FREDRICK, BOTH OF KOKOMO, INDIANA.

NUT-TAPPING MACHINE.

1,285,564.  Specification of Letters Patent.  Patented Nov. 19, 1918.

Application filed June 19, 1917.  Serial No. 175,560.

*To all whom it may concern:*

Be it known that I, OWEN J. COUGHLIN, a citizen of the United States, residing at Tipton, in the county of Tipton and State of Indiana, have invented certain new and useful Improvements in Nut-Tapping Machines, of which the following is a specification.

The present invention has to do with certain improvements in machines for tapping or threading nuts. The invention has to do with a machine for this class of work, in which the operations are entirely automatic, and so that from the time the blanks are thrown into the hopper until the completed threaded nuts are delivered from the machine, the operations will be entirely automatic and will not require more than casual attention on the part of an operator.

I am familiar with the fact that in the past there have been devised nut tapping machines whose functions are to a greater or less extent automatic, but these machines have been open to a number of more or less objections in regard to their construction and mode or principles of operation.

In one type of such machine, use is made of a tapper-tap, the shank of which is bent at right angles so that turning force can be applied thereto, the nuts being fed onto the straight portion of the tapper-tap, where they are threaded, and afterward being passed along and delivered around the bend of the shank. Such a machine, however, is very limited in its capacity, because it can make use of only one tapper-tap, and its capacity is accordingly limited.

One of the objects of the present invention is to provide a nut tapping machine of such form that a large number of tapper-taps may be simultaneously operated within the machine, so as to thereby greatly multiply the output or capacity of the machine, all of the tapper-taps being correlated or inter-related and combined with suitable nut-feeding and nut-discharging apparatus, so that the operations of the machine will be practically continuous, and so that a large number of taps may be fed by a single feeding mechanism.

I will not at this point further enlarge upon the objects to be accomplished by the use of the features of the present invention, but will state that many other objects and uses will appear from a detailed description of the same which consists in the features of construction and combinations of parts hereinafter described and claimed.

In the drawings: Figure 1 shows a side elevation of a completed machine embodying the features of the present invention, the said machine being provided with four tapper-taps arranged at positions 90° apart on the surface of the driving disk or plate. Although I have shown only four tapping mechanisms in this machine, it will presently become obvious that a greater or lesser number of taps and associated parts may be used and correlated within the machine, depending upon the necessities of the case and the wishes of the designer.

Fig. 3 shows a fragmentary horizontal plan view of the machine shown in Fig. 1, portions of the same being broken away so as to better reveal the interior construction.

Fig. 4 shows a vertical section through the machine of Fig. 1 on an enlarged scale, being taken substantially on the line 4—4 of Fig. 1, looking in the direction of the arrows.

Fig. 5 shows a fragmentary elevation of the lower portion of the machine shown in Fig. 1, the chuck being lowered and the tapper-tap released, and the tapper-tap being suspended while a previously tapped nut is discharged.

Fig. 6 shows a fragmentary elevation of the central portion of the machine, being an upper continuation of Fig. 5.

Fig. 7 shows a detail fragmentary horizontal section taken on the line 7—7 of Fig. 6, looking in the direction of the arrows.

Fig. 8 shows a vertical section through the lower portion of the machine, being taken on the line 8—8 of Fig. 5 looking in the direction of the arrows.

Fig. 9 shows a vertical section through the upper portion of the machine, being taken on the line 9—9 of Fig. 6, looking in the direction of the arrows. Fig. 9 may also be considered as a vertical continuation of Fig. 8.

Fig. 10 shows a vertical section taken on the line 10—10 of Fig. 9, looking in the direction of the arrows.

Fig. 11 shows a fragmentary detail view of one of the chucks and the cam mechanism by which it is operated, being a section on an enlarged scale taken on the line 11—11 of Fig. 1, looking in the direction of the arrows.

Fig. 12 shows a view taken on the line 12—12 of Fig. 11, looking in the direction of the arrows.

Fig. 13 shows a fragmentary view of the back portion of the operating plate, being an enlarged scale, back portion of the structure shown in Fig. 1.

Fig. 14 shows an enlarged scale, in fragmentary form, the nut feeding mechanism shown in Fig. 1, the mechanism as shown in Fig. 14 operating in regular or normal manner.

Fig. 15 shows a view corresponding to Fig. 14, with the exception that the trough has become overloaded with nuts, so that the operation of the feed mechanism has been arrested for the time being.

Fig. 16 shows a view taken on the line 16—16 of Fig. 14, looking in the direction of the arrows.

Fig. 17 shows a plan view of the nut-feeding mechanism and the trough, being an enlarged scale view of these parts which are also shown in Fig. 1.

Figure 1:
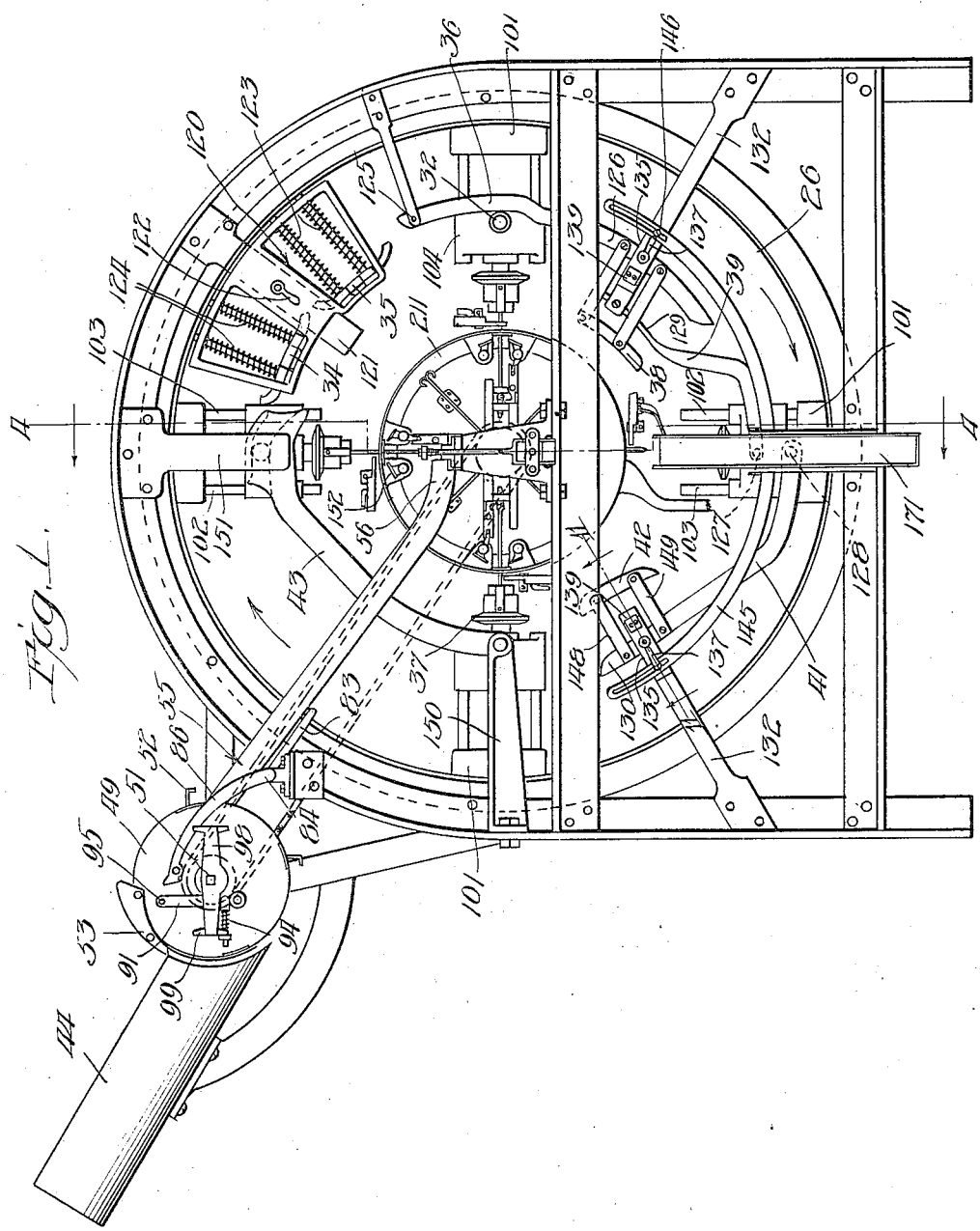

Figs. 18, 19, 20 and 21 are fragmentary cross-sections on the lines 18—18, 19—19, 20—20 and 21—21, respectively, of Fig. 17, looking in the direction of the arrows.

Fig. 22 is an enlarged detail, fragmentary view of the lower end of the nut-feeding trough and the immediately adjacent mechanism. It may be considered also as a fragmentary view of a portion of Fig. 3, and as a view taken on the line 22—22 of Fig. 9, looking in the direction of the arrows.

Fig. 23 is a section taken on the line 23—23 of Fig. 22, looking in the direction of the arrows; and, Fig. 24 is a detail view of a device for insuring a proper meshing of the pinions with the mutilated gear or rack on the back side of the machine.

I will now explain in detail the particular construction of mechanism and arrangement of parts shown in the various figures.

Journaled within a suitable frame is a main shaft 25 on which is mounted a circular disk 26. Around this disk there are mounted a plurality of radially extending chuck members 27, each of which is provided with a tapper-tap 28. These tapper-taps extend in a radial direction and they have their tapping ends 29 facing toward the center of the machine. The nut blanks are fed onto the inner ends of the tapper-taps, and after passing over the threads and being fully threaded they pass onto the unthreaded shanks and outward in a radial direction.

As the disk 26 rotates, the chucks are also forced to rotate on their own axes, thus rotating the tapper-taps. The nuts are fed in at a point adjacent to the center of the machine and are ultimately discharged from the outer ends of the tapper-taps, and for this purpose the chucks are so constructed and operated that at the proper time in the cycle of movements they are disconnected from their respective tapper-taps to allow the nuts to be released.

Figure 2:
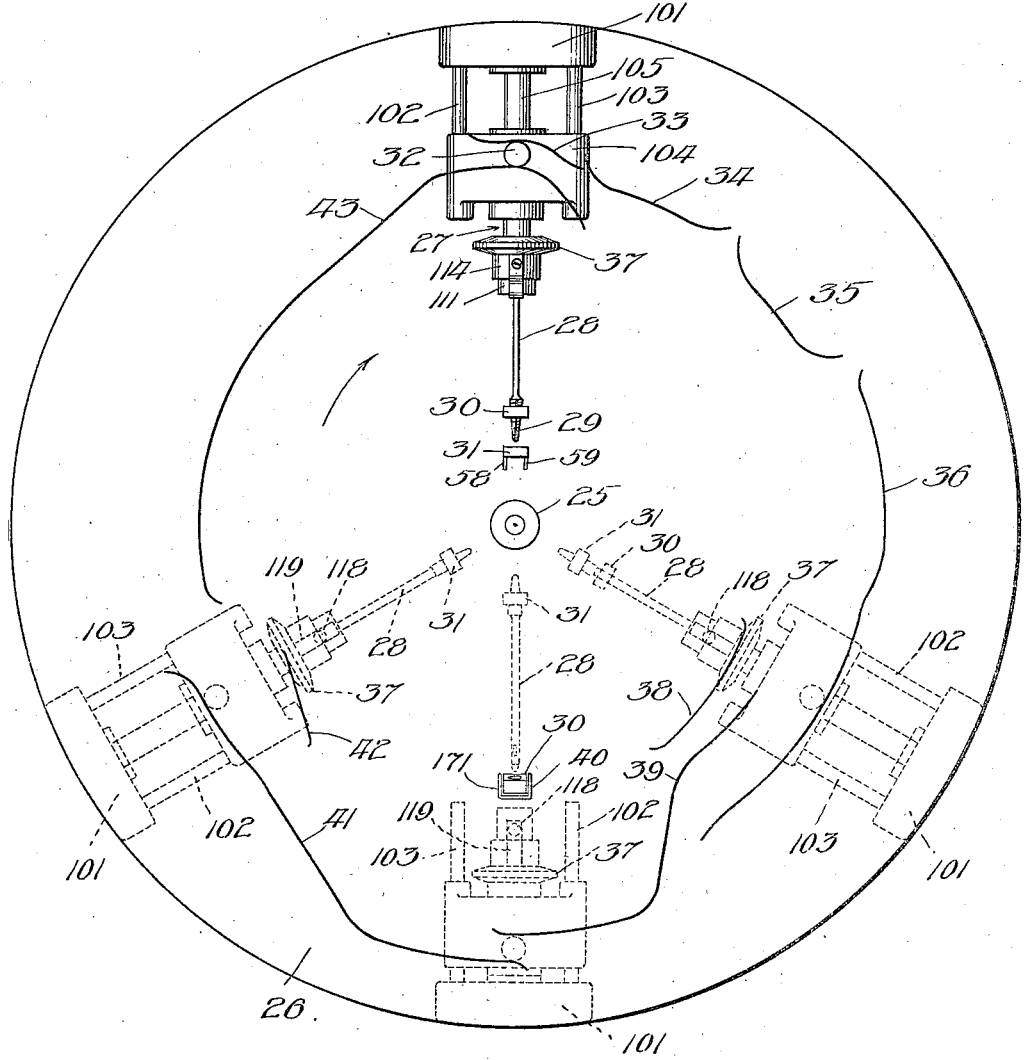
Fig. 2 shows diagrammatically a number of consecutive positions of one of the tapper-taps and certain correlated parts, and also shows in diagrammatic outline a set of cams for securing the desired movement of the parts in connection with said tapper-tap.

In order to understand the elemental principles of operation involved, reference may be had to Fig. 2, in which certain of the movements are shown diagrammatically. One of the chucks and its tap is shown in full lines at the upper side of the figure and is shown by dotted lines at three subsequent or consecutive positions. A nut 30 has been partly threaded over the lower end 29 of the tap 28 and another nut 31 has been fed into position immediately beneath the tap 28. A roller 32 is so connected to the chuck 27 that the radial position of said chuck is controlled by the engagement of its roller with various circumferential cam surfaces. It will be observed that in the full-line position of Fig. 2 the chuck and tap stand at a considerable distance away from the center of rotation or shaft 25. Immediately after passing from said position in a clockwise direction, as shown by the arrow in Fig. 2, the roller 32 will engage with a cam surface 33 to thereby force the chuck inwardly and thus carry the tap down into threading engagement with the nut 31. Simultaneously, rotation of the chuck and tap will thread the nut 30 upward along the threading end 29 of the tap. Means, presently to be explained, are provided for retaining the various nuts against rotation, while permitting them to slide or move along their respective taps.

After leaving the cam 33, the roller 32 engages a cam 34 formed on a circular arc which holds the tap under firm pressure or engagement with the new nut or unthreaded blank 31. As the rotation proceeds, another cam surface 35 is engaged by the roller 32, the surface 35 exerting a flexible pressure on the chuck and tap so as to commence the tapping operation under a flexible pressure, to thereby insure a proper biting of the teeth of the tap into the material of the blank. After leaving the cam surface 35, the roller 32 engages another cam surface 36 whose function will be presently explained more in detail.

The chuck 27 is provided with a circular flange 37 which is operatively connected with certain parts in such a way that when said flange stands at its inner position—that is, close to the inner end of the chuck 27—the tap is solidly gripped and not only held in place, but compelled to rotate with the chuck; but said construction is such that when the flange 37 is forced outwardly along the chuck, the tap will be unlocked, so that it can be released by the exertion of a slight pull away from the chuck.

Bearing the foregoing facts in mind, a cam surface 38 is provided in the lower portion of the machine against which the flange 37 will engage substantially at the point indicated by the dotted lines in Fig. 2 to thereby force the flange outwardly along the chuck so as to unlock the shank of the tap. The threading operation will, of course, cease at this time, and for this purpose the mechanism whereby the chuck is rotated is so constructed as to give an intermittent rotating action.

Having unlocked the chuck in the manner just explained, the roller 32 will next engage a cam surface 39 whereby the chuck will be thrown outwardly an extreme distance into the position shown by the dotted lines at the bottom of Fig. 2. If, during this movement, the tap be retained against a radial movement with respect to the disk 26, it will be obvious that the chuck will move away from the shank of the tap, so as to completely disconnect the two elements, leaving the tap suspended above the chuck and suspended in such position as shown by the dotted lines at the lower portion of Fig. 2. Means, presently to be explained, are provided for gripping the tap at the proper time in the cycle of movements and retaining the same in such suspended position.

About the time that the chuck reaches the position of the cam 38, the nut 30 will have threaded over the inner end of the threaded portion of the tap and been released from the threads, so that when the extreme lower position is reached, said nut 30 may be discharged into a trough or the like, 40. Meanwhile, the nut 31 will remain on the threads of the tap, as indicated.

After the nut 30 has been released, the roller 32 will ride onto a cam 41 whereby the chuck will be carried inward, so as to engage the tap and thereafter the flange 37 will ride onto a cam 42 by which said flange will be thrown inward so as to lock the tap into the chuck. The threading operation may then be continued by recommencing the rotation of the chuck while retaining the nut against rotation. Presently, the roller 32 will ride up onto a cam surface 43, by which the chuck will be moved outwardly, so as to raise the lower end 29 of the tap in order to admit a new nut into position so that the cycle of operations can be repeated.

The foregoing brief description of the cycle of operations is intended to simplify an understanding of the functions and relative duties of the mechanisms to be now explained. In this connection it will be borne in mind that those movements which have been recited as applying to a single set of parts, including a single chuck and a single tapper-tap, will apply equally well to any number of such elements following in rapid succession one after the other as the disk 26 rotates. For example, there may be mounted thirty or forty chucks and taps around the disk, so that the capacity of the machine will be multiplied thirty or forty times, as compared with its capacity for a single chuck and a single tap, and the movements of each such chuck and tap will follow in the order previously explained.

The blanks are delivered in the first instance into a hopper or the like, 44, whose construction is well shown in Fig. 16. The lower end of this hopper is closed by a wall 45, a slot 46 extending vertically along said wall. The pair of rods or fingers 47 and 48 extend vertically in the slot. These fingers sufficiently close the slot 46 to prevent the nut blanks from falling through the slots, but the spaces between the fingers are such as to permit the fingers 52 carried on a drum 49 to be presently described to work up through them and thereby take hold of the nut blanks.

Adjacent to the front end of the hopper is a disk 49 journaled on a hub 50 on the shaft 51. This shaft rotates in proper timed relationship with respect to the main shaft 25. On the periphery of the disk 49 are the sets or groups of fingers 52 which travel vertically or longitudinally through the slot 46 and serve to pick up the blanks from the hopper and deliver them one after another. A pair of flanges 53 and 54 extend outwardly from the upper portion of the hopper in arcuate fashion around the upper portion of the disk 49 so as to insure that the blanks will lie squarely on the periphery of the disk as the fingers 52 travel away from the upper end of the hopper.

Leading from the disk 49 to the central portion of the machine is a chute 55 through which the blanks travel to the feeding mechanism of the machine. The form of this chute is best shown in Fig. 17. The chute commences at a point adjacent to the central side portion of the disk 49, from which it slants downwardly to the delivery end 56. The periphery of the disk 49 is slanted or beveled, as at 57, at a point just in front of each of the sides of fingers 52, so that the blanks will slide sidewise from the disk into the trough or chute.

Carried by the rotating disk 26 is a pair of fingers or supports 58 and 59 corresponding to each of the chucks and taps. These fingers are so placed with respect to the corresponding chuck and tap that when a blank is supported on them it will be in position to receive the cutting end of the tap when the same commences its cutting operation. The lower end 56 of the trough 55 stands in the proper position to deliver the blanks onto the sets of fingers 58 and 59 at the beginning of each tapping operation and while the corresponding tap is raised into the initial or uppermost position. The feeding mechanism illustrated in the drawings comprises a finger 60 which works back and forth through the discharge or lower end 56 of the chute. Behind this finger is a plate 61 which can be reciprocated by a finger 62 connected to it by a pin and slot connection 63. The lower end of the finger 62 is bifurcated and is pivoted to a stationary part at the point 64. A pin 65 is slidingly mounted in the stationary block 66. Said pin has a sleeve or collar 67 which is pinned to the bifurcations of the finger 62 in the manner well illustrated in Fig. 4, wherein one of the pivot pins 68 will be observed. A spring 69 works between a collar 70 on the pin 65 and a stationary part 71, said spring tending to carry the pin 65 and also the bifurcated finger 62 inwardly at all times.

A cam block 72 is mounted on the end of the shaft 25, said cam block having the depressions 73 into which may enter the cam-head 74 on the pin 65. The depressions 73 are so spaced on the cam-block 72 that the pin 65 will be allowed to drop back under the impulse of the spring 69 in proper timed relationship to throw a blank from the end 56 of the trough onto the fingers 58 and 59, whereupon the finger 60 will be immediately retracted.

Examination of Figs. 22 and 23 will reveal the presence of a finger 75 on the upper face of the finger 60, which finger 75 will overlie the blank which is to be operated upon. This will prevent the blank from rising up away from the table on which it is sliding. The finger 60 and plate 61 are connected together by a pin 76, one end of which is connected to the finger 60 and the other end of which slides in a lug 77 on the plate 61. The nuts 78 limit the distance between the finger and the plate, as they are forced apart by a spring 79. The object of this arrangement is, to insure a uniform and complete movement or throw of the blank onto the fingers 58 and 59, notwithstanding slight irregularities or inequalities in the throws of the plate 61 under the impulse of the bifurcated finger 62. The advantage or desirability of this arrangement will be appreciated when it is considered that the finger 60 must make as many back and forth movements per revolution of the machine as there are sets of chucks and tapper-taps thereon.

In the ordinary operation of the machine, it is intended that the blanks shall be fed into the upper end of the chute 55 at the same rate as they are withdrawn or discharged from the lower end thereof. This will mean that the total number of blanks on the chute will remain constant. For example, the chute may be practically full of blanks at all times, a new one being added each time one is withdrawn from the lower end. There may arise occasions however when the blanks will not feed properly from the lower end of the chute. Each time this happens, the total number of blanks in the chute will increase by one, so that eventually the chute might become overcrowded and an irregular and improper feeding ensue. In order to guard against any such possibility, I have provided mechanisms which I will now describe: The floor of the chute is practically continuous from its lower end 56 upward a considerable distance to the point 80. At this point a sectional floor 81 is hinged to the chute, so that the upper end 82 of said section will tend to fall or move downwardly. A crank arm 83 is pivoted to a stationary part at a point 84, the outer end of said crank arm having a finger 85 which supports the end of the section 81. Another crank arm 86 is connected to the arm 83 and rocks therewith. The weight of the arm 86 is ordinarily sufficient to over-balance the weight of the arm 83 plus the weight of the floor section 81, so as to hold said section up in the position shown in Fig. 14. When, however, the floor section 81 is completely covered with blanks clear up to its upper end, as shown in Fig. 15, it becomes overloaded, so that the arm 83 is tilted down until it engages a stationary part, thereby raising the outer end 87 of the arm 86 into the position shown in Fig. 15.

The shaft 51 carries a cam-block 88 having the cam fingers 89 and 90. On the disk 49 is a driving arm 91 which is pinned to the disk at the point 92. This driving arm 91 has a finger 93 which will ordinarily be engaged by one or the other of the fingers 89 or 90, so as to drive the disk 49. A spring 94 tends to move the arm 91 into the driving engagement just explained. A pin 95 is carried by the outer end of the arm 91, and normally travels above the sidewise projecting finger 96 on the upper end 87 of the arm 86. When, however, the arm 86 is raised by the improper feeding of the blanks, the finger 96 will rise into the path of travel of the pin 95, so as to arrest the same. The continuous rotation of the disk 49 will then cause a relative swinging of the arm 91 on its pivot 92 against the force of the spring 94 and will thus presently disengage the finger 93 from the cam block 88. Thereupon the shaft 51 will rotate free of the disk 49 and for the time being no further feeding action will take place.

The parts would remain in the status thus explained, permanently and indefinitely, were it not for the provision of a special restoring mechanism. This comprises a pair of arms 97 and 98 which travel with the shaft 51. On the outer end of each of these is a cam-block 99 mounted in position to engage a pin 100 on the arm 86, so as to throw the same down in case it has been raised, thus permitting the arm 91 to spring under the impulse of its spring 94 to thereby reengage the clutch mechanism and recommence the rotation of the disk 49.

I will now explain more in detail the construction of the chuck and tapper-tap and the immediately associated parts. Corresponding to each of these groups of elements is a lug 101 on the periphery of the disk 26. A pair of pins or guide rods 102 and 103 extend inwardly from each of the lugs 101 and guide a block 104 in its travels. A stub shaft 105 is journaled in each of the lugs 101, the outer end of such stub shaft carrying a beveled pinion 106 by which it is driven. A sleeve 107 is rotatably mounted in each of the blocks 104, the outer end of said sleeve having a flange 108 which normally engages the outer face of the block 104. The sleeve 107 can, however, slide back and forth with respect to the block. The stub shaft 105 has a longitudinal slot 109 through which passes a cross-pin 110, the ends of which enter into the walls of the sleeve 107 so as to drive said sleeve with the stub shaft, no matter what the relative position of these parts may be. Into the lower end of the sleeve 107 is fastened a block 111 having a longitudinal recess or socket for the accommodation of the tapper-tap. The outer end of the tapper-tap is squared or flattened on its surface 112, so that a cross-pin 113 in the block 111 may engage said squared or flattened portion to compel the tap to rotate with the chuck. Nevertheless, the tap may be withdrawn from the chuck at all times, except when the locking mechanism, now to be explained, is in action.

This locking mechanism comprises the flange 37 on the collar 114, which collar is slidably mounted on the inner end of the sleeve 107. A pin 115 on the sleeve engages a slot 116 on the collar 114, so that the collar and flange 37 are rotated in the proper relationship to the sleeve 107. The tapper-tap has a socket or recess 117 into which may be entered a headed pin or the like, 118. The recess 117 has its end portions of cam shape, so that if the tap be slid in or out, the pin 118 will move in and out correspondingly. A spring finger 119 is carried by the sleeve 114, in such position that when the flange 37 and the sleeve are raised, the finger will press yieldingly on the pin 118, so as to create a sufficiently stiff engagement with the tapper-tap to hold the same in the chuck, while, nevertheless, permitting the tap to be pulled away from the chuck without undue labor. Therefore, the locking mechanism has two major positions, namely, that in which the tap is absolutely locked so that it cannot be pulled away from the chuck, and that in which it is yieldingly locked so that it can be withdrawn.

I have previously stated that the roller 32 is moved back and forth by various cam surfaces shown diagrammatically in Fig. 2. The general form of these cams and the method of supporting them is well shown in Fig. 2, and certain details of their construction are shown in Figs. 11 and 12. The cams 34 and 35 are conveniently carried by a frame 120. This frame in turn is adjustably mounted on a bar or stationary support 121. A handle or clamp 122 serves as a convenient means for locking the frame 120 at any desired radial position, so that the cams 34 and 35 can be adjusted in and out with respect to the center of rotation 25. Each of the cams 34 and 35 has a pair of arms or pins 123 sliding freely within the frame 120, the springs 124 forcing the cams outwardly to their extreme or normal position. The springs 124 serve to force the tap into the nut blank under spring pressure so as to insure a proper and firm biting of the tap into the material of the blank.

The cam 36 has one end pivoted to a stationary part at the point 125, and its other end 126 is adjustable. The cams 39 and 41 have their inner ends pivoted to a stationary part at the points 127 and 128, respectively, and their outer ends 129 and 130 are adjustable. The adjustability of the ends 126, 129, and 130 is desirable for the following reason: As the tapper-taps are repeatedly sharpened, they become shorter. Therefore, it becomes necessary to force the chucks more and more toward the center of rotation 25, in order to insure a proper tapping operation. By setting the ends 126, 129, and 130 inward, the reduction in length of the taps may be compensated for. The adjustability of the frame 120 performs a similar function with regard to the cams 34 and 35.

The adjustability of the cams 36, 39, and 41 is conveniently effected in the manner illustrated in Figs. 11 and 12. Fig. 11 is a section taken on line 11—11 of Fig. 1, looking in the direction of the arrows, and it is also illustrative of the construction whereby the ends 126 and 129 may be adjusted. A block 131 is slidably mounted on the stationary part 132. This stationary part is slotted at 133, a pin 134 passing through the slot and into engagement with the block 131. A plate 135 engages the pin 134 and works against the front face of the stationary part 132. A collar 136 surrounds the pin 134 and presses against the plate 135, a hand wheel 137 serving as a means of drawing the collar 136 against the plate 135.

This will lock the block 131 with respect to the stationary part 132. In order to secure an absolutely positive lock, a series of notches 138 may be provided in the stationary part, a finger 139 on the plate 135 taking into the selected one of the notches 138 to thereby lock the parts against movement on the stationary part 132, even though the hand wheel 137 may not be brought up solid.

The block 131 has a pair of lugs 140 and 141 between which extends a pin 142. A block 143 is secured to said pin, said block 143 carrying the end portion of the cam bar 41, 39, or 36, as the case may be. A spring 144 raises the block 143 with its cam bar, so that the cam bar is always held in position under spring pressure, so that it can yield in case of necessity without danger of breaking the parts. Also this spring pressure is found to give a much better action of the taps in the nut blocks.

An arcuate bar 145 is observed in the lower portion of Fig. 1, said bar extending between the blocks 135 on the two sides of the machine. The end portions of this bar 145 are slotted and are pinned to the plates 135 by the tap-screws 146, so that the end portions of the bar rise and fall with the adjustments of the blocks 135. The central portion of the bar 145 carries a post 147, best shown in Fig. 8, whose function and purposes will be better understood after the construction and operation of the nut discharging mechanism has been explained.

Each of the cams 38 and 42 is relatively short. These cams are conveniently carried by the pairs of arms 148 and 149 from the blocks 143 or the end portions of the cams 41 and 36, respectively. With this arrangement, the cams 38 and 42 will be adjusted back and forth simultaneously with the adjustment of the cams 36, 39, and 41.

The cam 43 has one end connected to a stationary part 150, and the other end connected to a stationary part 151. Ordinarily no adjustment of this cam is necessary, but, of course, such adjustment might be provided in any desired manner. The cam 33 may be conveniently formed as a portion of the cam 43, as shown in Fig. 1, or it might be formed as a separate block supported in any suitable manner.

I have previously explained that, at the proper point in the cycle of operations, the tap is released from its chuck, and is then suspended by suitable mechanism, while the previously threaded nut is discharged over its freed shank. I will now explain the mechanisms whereby these results may be accomplished. Mounted upon the disk 26 in position to engage each tap is a pair of fingers or plates 152 and 153. These are mounted on the stub shafts 154 and 155 which extend through the disk 26 to its back side. Each of the plates 152 and 153 is provided with a semi-circular recess or notch 156, so that, when the two plates are swung together, into the position shown in Fig. 5, they will clamp the shank of the tapper-tap between them so as to hold the same against lateral movement.

The stub shafts 154 and 155 have the cranks 157 and 158 on their rear ends, which cranks are connected to a slidable block 159 through the medium of the links 160 and 161, respectively. The block 159 works in suitable guideways 162 and 163 and has a roller 164 on its back face. A spring 165 tends to throw the block 159 toward the center of the machine so as to swing the cranks into the position shown in the upper portion of Fig. 13, to thus open the plates 152 and 153 and release the tap. The cam block 166 is fixedly mounted in the lower portion of the machine behind the disk 26 and in position to engage the rollers 164 of the blocks 159, so as to move said blocks and thus swing the cranks 157 and 158 to thereby grip the taps. The cam 166 is so positioned and of such length and form that each tapper-tap is engaged about the time that its flange 37 passes away from the cam 38 and just before the corresponding roller 32 engages the cam surface 39 so as to draw the chuck away from the tap. Also the cam 166 terminates at a proper point to cause the plates 152 and 153 to release their tap at about the time that the flange 37 rides onto the cam 42.

The plates 152 and 153 serve to retain the tap against lateral movement, but they may not grip the shank with sufficient force to prevent the same from sliding down. I have, therefore, provided a finger 167 corresponding to each pair of plates 152 and 153. The finger 167 is pivoted at the point 168, and its lower end is slotted or bifurcated. One of the plates 152 or 153 has a finger 169 with a pin 170 engaging the slot of the finger 167, so that, when the plates 152 and 153 are brought together, the finger 167 will be swung under the nut which is threaded onto the tap, so as to retain the tap in elevated or raised position, as shown in Fig. 5.

While the tap stands in the position shown in Fig. 5, the chuck is lowered away from the tap by the instrumentalities already described. The nut discharge trough 171 is provided in the lower central portion of the machine and occupies a position with its upper end 172 immediately beneath the position of the tap at the instant of nut discharge.

As the disk 26 rotates, and each tap approaches more and more nearly the suspended vertical position shown in Fig. 5, the previously threaded nut will tend to slide down along the shank and drop off of the lower end thereof as soon as the chuck is withdrawn from the tap. If the threaded nuts were allowed to slide off from the taps without any particular timing of this operation, they would probably become engaged with moving parts of the machinery, thereby clogging the same. Furthermore, it would be difficult, if not impossible, to secure a uniform discharge of the nuts along a definite discharging element, such as the chute 171. I have, therefore, provided means for holding each nut on the shank of its tap until the proper instant for its discharge into the chute 171. Such means takes the form of a hooked plate or the like 173 pivoted to the disk 26 at the point 174. The outer end of the said plate is hooked as at 175, so that, when the plate is swung inwardly into the dotted line position of Fig. 7, the hook will engage the shank of the tap, and thus prevent the nut from sliding down along the same. As the disk 26 rotates, the force of gravity will cause the finger 173 to engage their respective tapper-taps as they are descending toward the point of discharge, and to disengage from the tapper-taps as they commence to rise after passing the point of discharge.

Mounted on a stationary part, as, for example, the upper end 172 of the chute 171, is a stand or bracket 177, the upper end of which is in position to engage a finger 178 on the plate 173. As the disk 26 rotates passing the lowermost position of the tapper-tap, the bracket 177 will engage the finger 178, thereby swinging the same from the tapper-tap so as to allow the discharge of the nut.

I have previously explained that the bracket 147 is carried by the arm or bar 145. This bracket 147 carries the discharge trough 171, so that said discharge trough is raised and lowered according to the adjustments of the end portions of the cams 36, 39, and 41. Consequently the upper end 172 of the discharge trough will always maintain the correct elevation for receiving the nuts, even as the lengths of the taps vary with their repeated sharpening.

In order to retain the various blanks against rotation while they are being threaded, I have provided the fingers 181 and 182 adjacent to each pair of the supporting fingers 58 and 59. These fingers 181 and 182 are mounted on and travel with the disk 26.

Suitably mounted on a stationary part of the machine is the circular rack 183 with which the various pinions 106 mesh. This rack is so formed that it gives the proper driving to the taps as the disk 26 is rotated on its shaft 25. Ordinarily the rack 183 will be continuous, with the exception of its lower portion which will be mutilated or cut away, so that the chucks and taps will not be rotated substantially during the interval that they are traveling from the cam 38 to the cam 42. During this interval the previously threaded nuts are being discharged.

In order to insure a proper meshing of each of the pinions 106 with the rack 183 as it passes the mutilated section, any suitable means may be provided. I have, however, illustrated for this purpose a star wheel or the like 184 secured to each of the pinions 106, which star wheel will accurately position the pinion, so that its teeth will, of necessity, mesh correctly with the rack 183. For this purpose, I provide a plate 185, one end of which is pivoted to a stationary part at 186, the other end being under pressure of the spring 187. This plate 185 has a series of notches 188 adapted to engage points 189 of the star wheel in case the pinion is not in the correct position. Such engagement will rotate the star wheel a quarter of a turn to a point where the proper meshing will occur. If the pinion stands in the correct position, its points 189 will travel across the face of the bar 185 without engaging the recesses 188.

I will now explain the oiling system which I have illustrated for properly oiling or lubricating the blanks and taps at all times during threading operations. It is to be observed that a portion of the threading takes place while the taps stand in the suspended position shown in full lines at the upper portion of Fig. 1, while other portions of the threading operation takes place with the taps pointing either directly or partly upward, as shown by dotted lines in the lower portion of Fig. 2. There is, of course, a tendency for the oil or water used as lubricant to flow downward, and, consequently, it is desirable to deliver the lubricant into one face of the blank during a portion of the tapping operation and into the other face of the blank during the remainder of the tapping operation. I, therefore, have provided a lubricating system, whereby the proper delivery of lubricant will be insured at all times.

Corresponding to each tap is a pair of lubricant nozzles 190 and 191 which extend through the disk 26 from its back side. The positions of these nozzles are well illustrated in Figs. 4, 8, and 9. Each nozzle 190 is farther from the center of rotation than the corresponding nozzle 191. The nozzles 190 are in operation at times when they will be effective to deliver lubricant above the blanks; and the nozzles 191 are in operation at other times. For example, the nozzle 191 in Fig. 8 would be in operation, while the nozzle 190 of said figure would be idle; whereas, a reverse condition would be obtained at other times.

All of the nozzles extend through the disk 26 to its back side where they communicate with sockets 192 whose construction is best shown in Fig. 9. Each of the sockets 192 has a pair of oppositely disposed holes 193 and 194 which communicate with the space 195 on the interior of a hollow disk or chamber behind the disk 26. A plug valve 196 is provided corresponding to each socket 192, said plug valve having a central bore 197, and a pair of side openings which can be brought into registry with the openings 193 when the plug valve 196 is turned in correct position. For example, the valve for the nozzle 190 in Fig. 9 is open; whereas the valve for the nozzle 191 in said figure is closed. Each of the plug valves 196 has a crank finger 198, whereby it may be rocked. A pin 199 is provided on the hollow disk 195 for each of the crank fingers 198, to which it is connected by means of a spring 200, so that there is always a tendency for the plug valves to be turned into closed position.

Behind the hollow disk 194 is a stationary disk 201. The same has suitable cam surfaces 202 and 203 on its front side mounted in position to engage with the crank fingers 198 so as to open the valves at the proper times in the cycle of movements and hold them open during the proper intervals. These cam surfaces may, of course, be so formed as to cause a delivery of lubricant only during the intervals during which threading operations are actually taking place.

The lubricant for the hollow disk 195 is delivered through the center of the shaft 25 through the passageway 204, as shown in Fig. 4. It comes, in the first instance, from a pipe 205 which is connected to the passageway 204 by a stuffing box 206.

The lubricant thus delivered into the blanks and taps must be collected and returned to a suitable receptacle. For this purpose, I have provided the constructions which I will now explain. In the lower portion of the machine and connected to a stationary part is a pocket 207 having an arcuate floor 208 which tilts downwardly and forwardly toward its front wall 209. A discharge pipe or tube 210 conducts the lubricant away from the pocket 207. Projecting forwardly from the front face of the disk 26 is the flange 211. The same has a recess of circular openings 212 through which are extended the taps, and which openings are also of sufficient size to pass the completed nuts. The flange 211 overlies the back edge of the floor 208 of the pocket 207, as shown in the lower portion of Fig. 4.

The space inclosed by the flange 211 is divided into a series of forwardly facing compartments or the like by intermediate partitions 213, best shown in Figs. 5 and 6. The outer edges of these partitions 213 are hooked as at 214, so that any oil flowing down over them will be caught in the hooks and will run forward and be discharged from the front edges of the hooks. The inner edges of the partitions 213 coöperate with a hub member 215 which has the recessed or depressed portion 216 corresponding to the forwardly facing pockets previously described. These depressions 216 communicate with an annular space 217 through the medium of the passages 218 through which the lubricant is delivered to the space 217. Lubricant so delivered passes down around through the space 217, and is discharged into the pocket 207.

The major portion of the lubricant delivered into the nuts and taps will run off sidewise, because the great bulk of the lubrication takes place while the taps lie at more than thirty degrees from the vertical line. Lubricant running off sidewise in this manner will find its way onto the partitions 213, and thence into the hooked portions 214, so that it will find its way directly into the pocket 207 without running down through the openings 212.

From an examination of Figs. 4 and 9, it will be observed that the blank feeding finger 60 extends rearwardly so far that it would interfere with the rotation of the partitions 213, so that said partitions would strike against it, and thus lock the machine. This does not take place because the position of the finger 60 shown in the said figures is only momentarily, and the said finger is thrown back and forth in synchronism with the rotation of the disk 26, so that, as the partitions 213 pass the said finger, the said finger stands in retracted position, so that the partitions can pass.

In order that the operation of the machine and the synchronism of its various parts may be better understood, I will now explain briefly the various movements in the order in which they take place: The disk 26 is driven in any suitable manner as, for example, by rotation of the shaft 25 through the medium of a key 219 shown in Figs. 4 and 9. As the disk rotates, the chucks and taps are carried around, and the meshing of the beveled pinions 106 with the mutilated rack 183 rotates the chucks and devices intermittently. For purposes of simplicity in description, I will explain the operations of one chuck and its top and correlated parts, it being understood that a similar description will be applicable to each of the other groups of mechanism.

Assuming the chuck and tap to stand at the top position shown by the full lines in Fig. 2, the blank 31 illustrated in said figure was previously thrown into the position on the fingers 58 and 59 by the operation of the blank feeding mechanism previously explained. As the disk 26 continues to rotate in the direction of the arrow shown in Fig. 2, the fingers 58 and 59 supporting the blank 31 will turn with the disk, so that, as the chuck is forced down by the cam 33, the tap 28 will be forced into the hole of the blank. The blank will be held against rotation by the presence of the fingers 181 and 182 corresponding to the chuck and tap in question. About the time that the tap has been forced down far enough to carry its threads into firm engagement with the material of the blank, the roller 32 will travel onto the cam 34, so that a spring pressure will be exerted on the tap, thus insuring that the teeth of the tap will bite properly into the material of the blank. This spring pressure will be continued by the cam 35. When the first portion of the cam 36 is reached, the roller 32 will travel on a practically circular arc until the tap comes to a practically horizontal position. After the teeth of the tap have bitten into the material of the blank, the tap will continue to thread its way through the blank without the necessity of exerting very much pressure upon it. The cams 34 and 35 under spring pressure serve to start the threading operation and to carry it to the point where the teeth of the tap will continue to bite into the material of the blank without the exertion of further pressure, and the cam 36, therefore, does not need to exert very much pressure upon the blank.

Ordinarily the nut 30 which was previously taken into the teeth of the tap will run off of the back end of said teeth before the tap reaches the cam 36. As soon as this takes place, the completed nut 30 will lie freely on the shank of the tap, so that, as the tap passes below the horizontal position, the nut 30 will tend to slide down toward the chuck. This sliding will be limited, however, by the bifurcated finger 173 shown in Fig. 7, so that the nut will not be able to fall down far enough to in any way interfere with the proper operation of the other mechanisms. Since the bifurcated finger 173 is farther from the center of rotation 25 than the plates 152 and 153, it follows that the nut will fall along the shank of the tap to a position outside of said plates, so that, when they close into the position shown in Fig. 5, the nut will be beneath them and supported by the finger 173.

Just about the time that the flange 37 rides into the cam 38 or slightly prior thereto, the pinion 106 will reach a mutilated portion of the rack 183, so that the rotation of the chuck and tap will cease. At the same time the cam 36 will run out, so that the outward movement of the chuck head will not be interfered with. As the flange 37 travels onto the cam 38 to release the tap from the chuck, the plates 152 and 153 will close against the tap, thereby simultaneously throwing the finger 167 beneath the blank which is on the teeth of the tap, so that for the time being the tap and the threading blank will be supported by the fingers 152 and 153 and the finger 167. This support should take place before the roller 32 reaches the cam 39, so as to back the chuck away from the tap. The cam 39 should, however, be so proportioned that the chuck will be backed away from the tap the extreme distance before the chuck passes under the chute 40. Furthermore, the tap should be supported by the fingers 152 and 153 and the finger 167 at sufficient elevation to clear the flanges of said chute.

As the tap passes into the vertical position and immediately over the chute 40, the flange 180 of the finger 173 will engage the finger 178, so as to release the nut from the tap and allow it to fall into the chute 40.

The cam 41 should be so formed that, as the chuck and tap pass away from the position of the chute 40, the roller 32 will ride up under the cam 41, thereby raising the chuck and causing it to pass over the end of the tap. When this has taken place, the flange 37 will ride onto the cam 42 so as to force said flange inwardly and thereby lock the tap into the chuck. The mechanism is then ready to continue the tapping operation. The pinion 106 will then ride into the continuation of the rack 183 so as to continue the tapping operation.

While the pinion 106 is passing over the mutilated portion of the rack, so that there is no tapping going on, it is not essential to continue the oiling. Consequently, the cams 202 and 203 which operate the oiling valves may conveniently be made of the form shown in Fig. 13. From an examination of this figure, it will be seen that the oiling takes place only during the actual process of tapping the nut.

After the roller 32 passes away from the cam 41, it will ride into a circular arc portion of the cam 43, so that the chuck and tap will be held at a practically constant distance from the center of rotation until the tap approaches the vertical position shown at the top of Fig. 2. During all this time the tapping operation continues because the teeth of the tap having once bitten into the material of the blank will continue to thread the blank as long as the blank is held against rotation. As the tap approaches the vertical position, the roller 32 will ride onto the upper portion of the cam 43 so as to raise the tap and nut to a sufficient elevation to permit the lower end of the tap to ride above the blank 31 which is thrown onto the fingers 58 and 59 at the proper instant.

In the foregoing description and in the drawings hereunto appended, I have disclosed but a single embodiment of the features of my invention. Furthermore, the machine so disclosed is what may be called a single ended machine—that is, there is but a single machine on the shaft 25. It is evident, however, that two machines might very conveniently be built onto a single shaft, said machines facing in opposite directions. By so doing it would be possible to make use of a single oiling system, and, furthermore, certain other mechanisms, as, for example, the rack, might be so built as to serve for both of the machines.

The cam 35 is set closer to the axis of rotation than the cam 34, so that it carries the taps farther in under spring pressure. The nut blanks are generally punched and the size of the hole is not always absolutely uniform. Consequently, it is very desirable to provide the cam 35 set somewhat closer to the axis of rotation than the cam 34 so as to insure a proper biting of the tap into the material of the nut regardless of the exact size of the hole.

It will be observed from an examination of Figs. 17 and 19 that one side of the chute 55 is grooved or depressed as at 57$^a$. It will also be observed that a finger 57$^b$ extends across the chute from one side to the other. This finger stands at a sufficient elevation above the floor of the chute to permit nuts which are lying on their flat sides to travel under it, but will prevent a nut traveling on edge from passing under it. Consequently, any nuts that may be standing on edge when they reach this finger will be turned over and laid down onto their flat sides, so that they will be properly fed into the machine by the mechanism which they subsequently encounter.

Referring again to Fig. 13, the block 159 therein comprises the two sections 159 and 159$^a$, the spring 165$^a$ normally holding the block 159$^a$ against the block 159. When the roller 164 rides onto its cam surface, the spring 165$^a$ will hold the blocks 159 and 159$^a$ together until the plates 152 and 153 firmly grip the tapper-tap. Then if the cam forces any further movement of the roller 164, the spring 165$^a$ will yield. This arrangement makes it possible to insure a firm grip of the tapper-tap regardless of inequalities in the size of the parts, and regardless of their wear, and also regardless of the exact sizes of the tapper-taps.

An examination of Fig. 2 will show that the cams 36, 38 and 39 are so proportioned and related that the flange 37 engages the cam 38 while the roller 32 still engages the cam 36. This insures that the pressure of the cam 38 against the flange 37 will force said flange toward the body of the chuck, the chuck being held against movement by engagement of the roller 32 against the cam 36.

The discharge trough 171 is pivoted to the bracket 147 at the point 171$^a$. Also reference particularly to Figs. 4 and 8 will show that the lower portion of the finger 177 extends inwardly toward the disk 26, as shown at 177$^a$. This construction is illustrated for the following reason: The supporting of the tapper-taps in the position shown in Fig. 8 is, to a large extent, dependent upon the presence of a nut on the threads thereof against which the fingers 167 can engage. If, for any reason, a nut should feed properly onto the tapper-tap, it would be evident that, when said tapper-tap reached the lowermost position during the travel of the disk 26, it would not be properly supported, and, therefore, would still have its shank connected into its chuck. The result would be that the tapper-tap would strike against the upper end of the chute 171 and either the tapper or the chute would be broken. By providing the cammed surface or portion 177$^a$ on the finger 177 and by pivoting the chute 171, it is possible for the chute to tilt or swing when a tapper-tap passes it in the manner just explained. This construction is also beneficial, and in fact quite necessary during the initial starting of the machine, for the reason that when the taps are first inserted into the machine at the uppermost position of the disk 26, they travel for practically a full revolution before receiving a nut.

I claim:

1. In a machine of the class described, the combination of a disk mounted for rotation about a horizontal axis, a plurality of chuck members journaled on the disk for rotation about radial axes, each chuck member being radially movable with respect to the disk, means for at times locking a tapper-tap into each chuck member, a pair of fingers on the disk mounted in position to support a nut blank adjacent to the inner end of each tapper-tap and in position to be operated on thereby, means adjacent to each pair of fingers for retaining the corresponding nut blank against rotation during the tapping operation, means for feeding the nut blanks into position on the sets of fingers in succession, means for rotating the chuck members on their radial axes intermittently and for allowing them to remain idle during the lowermost portion of their travel as the disk rotates, means for supporting each tapper-tap independently of its chuck member during the lowermost travel of the chuck member during the rotation of the disk, means for releasing each chuck member from its tapper-tap and withdrawing it from its tapper-tap during the interval aforesaid, means for discharging nuts from the shanks of the tapper-taps during the intervals aforesaid, and means for delivering lubricant onto each tapper-tap during the tapping operation thereof, substantially as described.

2. In a machine of the class described, the combination of a member mounted for rotation about a horizontal axis, a chuck member carried thereby and adapted to rotate about a radial axis, said member being radially movable with respect to the member, means for at times locking a tapper-tap into the chuck member, means for supporting a nut blank adjacent to the tapping end of the tapper-tap, means for delivering a nut blank onto said supporting means for each cycle of operations of the machine, means for rotating the chuck member on its own axis during the travel of the member first aforesaid, and for allowing the chuck member to stand idle during the lowermost portion of its travel, means for supporting the tapper-tap independently of the chuck member during the time interval last mentioned, and means for delivering a nut from the shank end of the tapper-tap during the interval last mentioned, substantially as described.

3. In a machine of the class described, the combination of a member mounted for rotation about a horizontal axis, a chuck member carried thereby and adapted to rotate about a radial axis during the rotation of the first mentioned member, means for rotating the chuck member on its own axis intermittently during the travel of the first mentioned member about the horizontal axis, means for at times locking a tapper-tap into the chuck member, while permitting removal therefrom when the chuck member is not rotating on its own axis, means for supporting the tapper-tap independently of the chuck member when the chuck member is not rotating, means for withdrawing the chuck member from the tapper-tap at such time, and means for delivering threaded nuts from the shank of the tapper-tap at such time, substantially as described.

4. In a machine of the class described, the combination of a chuck member adapted to travel through a cycle of movements, during a portion of which cycle the chuck member is supported in upwardly facing position, and during another portion of which cycle the chuck member is supported in downwardly facing position, means for rotating the chuck member on its own axis when it stands in downwardly facing position, means for locking a tapper-tap in the chuck member when the same stands in downwardly facing position and for releasing the tapper-tap from the chuck member when the same stands in upwardly facing position, means for supporting a tapper-tap independently of the chuck member when the same stands in upwardly facing position, means for feeding a nut blank into position beneath the tapper-tap when the chuck member stands in downwardly facing position, means for withdrawing the chuck member from the tapper tap when it stands in upwardly facing position, and means for delivering a threaded nut from the shank end of the tapper-tap at such time, substantially as described.

5. In a machine of the class described, the combination of a chuck member, means for causing the same to travel through a cycle of movements, during one portion of which cycle the chuck member faces upwardly and during another portion of which the chuck member faces downwardly, means for locking a tapper-tap into the chuck member when the latter faces downwardly, means for unlocking the tapper-tap from the chuck member when the latter faces upwardly, means for supporting the tapper-tap independently of the chuck member at such time, means for withdrawing the chuck member from the tapper-tap at such time, means for feeding a nut blank into position beneath the tapper-tap when the chuck member faces downwardly, and means for delivering a completed nut from the shank end of the tapper-tap when the chuck member is withdrawn therefrom, substantially as described.

6. In a machine of the class described, the combination of a chuck member, means for causing the same to travel in a cycle of movements, during a portion of which the chuck member faces upwardly and during another portion of which the chuck member faces downwardly, means for locking a tapper-tap into the chuck member when the latter faces downwardly, means for unlocking the tapper-tap from the chuck member when the latter faces upwardly, means for supporting the tapper-tap independently of the chuck member at such time, means for disconnecting the tapper-tap and chuck member at such time to permit the delivery of a completed nut from the shank end of the tapper-tap, and means for delivering a nut blank into position adjacent to the tapper-tap when the chuck member faces downwardly, substantially as described.

7. In a machine of the class described, the combination of a chuck member adapted to travel in a cycle of movements, during a portion of which cycle it faces upwardly and during another portion of which cycle it faces downwardly, means for locking a tapper-tap into the chuck member during the last mentioned portion of the cycle and for unlocking the tapper-tap from the chuck member during the first mentioned portion of the cycle, means for disconnecting the tapper-tap at such time to permit the delivery of a completed nut from the shank end of the tapper-tap, and means for delivering a nut blank in position adjacent to the tapper-tap when the chuck member faces downwardly, substantially as described.

8. In a machine of the class described, the combination of a chuck member, means for causing the same to travel bodily radially about a horizontal axis, means for locking a tapper-tap into the chuck member during a portion of such travel and for unlocking the tapper-tap from the chuck member during another portion of such travel, means for disconnecting the chuck member and the tapper-tap when they are unlocked, means for delivering a completed nut from the shank end of the tapper-tap when they are so disconnected, and means for delivering a nut blank into position adjacent to the tapper-tap, substantially as described.

9. In a machine of the class described, the combination of a chuck member adapted to travel bodily radially about a horizontal axis, means for locking a tapper-tap into the chuck member during a portion of such travel, and for unlocking the tapper-tap from the chuck member during another portion of such travel, means for disconnecting the tapper-tap and chuck member when so unlocked, means for rotating the chuck member on its own axis when the tapper-tap is locked into it, means for delivering lubricant onto the tapper-tap when it is locked to the chuck member, substantially as described.

10. In a machine of the class described, the combination of a chuck member adapted to travel bodily radially about a horizontal axis, means for locking a tapper-tap into the chuck member during a portion of such travel and for unlocking the tapper-tap from the chuck member during another portion of such travel, means for disconnecting the chuck member and tapper-tap during the last mentioned interval, means for delivering a completed nut from the shank of the tapper-tap when so disconnected, means for rotating the chuck member on its own axis when the tapper-tap is locked into it, and means for delivering lubricant onto the tapper-tap at such time, substantially as described.

11. In a machine of the class described, the combination of a chuck member traveling through a cycle of movements, during a portion of which cycle it faces downwardly a greater amount than during another portion of the cycle, means for locking a tapper-tap into the chuck member during the last mentioned portion of the cycle and for unlocking the tapper-tap during the first mentioned portion of the cycle, means for disconnecting the tapper-tap and chuck member when so unlocked, means for delivering a completed nut from the shank of the tapper-tap when so disconnected, and means for delivering a nut blank into position adjacent to the tapper-tap when it is locked into the chuck member, substantially as described.

12. In a machine of the class described, the combination of a chuck member, a tapper-tap in conjunction therewith, means for causing the chuck member and tapper-tap to travel through a cycle of movements, during a portion of which the tapper-tap points upwardly and during another portion of which the tapper-tap points downwardly, means for delivering lubricant to one portion of the tapper-tap when it points upwardly, and means for delivering lubricant to another portion of the tapper-tap when it points downwardly, substantially as described.

13. In a machine of the class described, the combination of a chuck member, a tapper-tap in conjunction therewith, means for causing the chuck member and tapper-tap to travel through a cycle of movements, during one portion of which the tapper-tap points upwardly and during another portion of which the tapper-tap points downwardly, and means for delivering onto the tapper-tap lubricant always at a point above the working portion of the tapper-tap, substantially as described.

OWEN J. COUGHLIN.